United States Patent [19]

Payne

[11] Patent Number: 4,660,428
[45] Date of Patent: Apr. 28, 1987

[54] DRIVE TRAIN SYSTEM

[75] Inventor: Peter Payne, Wheeling, Ill.

[73] Assignee: Honeywell Inc., Minneapolis, Minn.

[21] Appl. No.: 861,967

[22] Filed: May 13, 1986

[51] Int. Cl.⁴ .............................................. F16H 21/54
[52] U.S. Cl. ............................... 74/104; 74/424.8 VA; 464/47
[58] Field of Search ............... 74/424.8 VA, 104, 105, 74/102; 464/47; 251/81

[56]  References Cited
U.S. PATENT DOCUMENTS

| 101,940 | 12/1870 | Tatham . |
| 330,391 | 11/1885 | Gifford . |
| 621,277 | 3/1899 | Peckham . |
| 804,778 | 6/1905 | Smith . |
| 1,067,144 | 7/1913 | Schilling . |
| 1,780,194 | 5/1929 | Kende . |
| 1,796,992 | 11/1929 | Helm et al. . |
| 1,928,191 | 10/1930 | Van Meurs . |
| 1,952,355 | 10/1930 | Belshaw . |
| 2,016,745 | 3/1935 | Huthsing . |
| 2,397,126 | 4/1944 | Buhrendorf . |
| 2,632,542 | 1/1947 | Hendrickson . |
| 2,643,530 | 6/1953 | Lathrop . |
| 2,704,947 | 4/1953 | Hopkins . |
| 3,034,760 | 5/1962 | Henrion . |
| 3,063,298 | 11/1962 | Elliott . |
| 3,452,384 | 6/1967 | Scinta . |
| 3,575,378 | 4/1971 | Fawkes . |
| 3,585,817 | 8/1969 | McCafferty, Jr. et al. ............ 464/47 |
| 3,640,140 | 2/1972 | Gulick et al. ............ 74/424.8 VA X |
| 3,654,777 | 4/1972 | Grundman . |
| 3,677,108 | 7/1972 | Prikryl et al. . |
| 3,877,677 | 4/1975 | Daghe et al. . |
| 4,149,561 | 4/1979 | Dalton . |

Primary Examiner—Kenneth Downey
Attorney, Agent, or Firm—John P. Sumner

[57]  ABSTRACT

A drive train system for rotating an axle in an external system about an axis which is perpendicular to a driven shaft. The driven shaft has a drive screw thereon and is rotatable about a fixed axis. A drive nut is located on the drive screw and is movable along the length thereof as the drive screw is rotated. A two-part, slidably interconnected crank arm has one part fixed to the axle and the other part slidably interconnected with the drive nut. A power drive is operably connected to the driven shaft through a friction drive including a driven member mounted on the shaft by means of a slip fit through a center hole and a friction plate rotating with the shaft through a center opening. An annular-ring surface between the driven member and the friction plate creates an interface which limits the frictional drive force developed thereby.

20 Claims, 4 Drawing Figures

DRIVE TRAIN SYSTEM

BACKGROUND OF THE INVENTION

The system disclosed in the present application is a drive train system for rotating an axle connectable to the system, typically for the purpose of controlling fluid control valve mechanisms such as butterfly-type valves. Such valves are present in air ducts in the form of dampers which may be opened or closed to varying degrees using the present system. In addition, the present system may be used to open and close water or steam valves in heating and cooling systems. However, the present system is not limited to such applications.

The present drive train includes a crank arm having first and second members which slideably inner-connect. The crank arm, which is discussed further below under the heading "Sliding Crank Arm," has the advantage of permitting a drive train system to exist where there is limited space available for the system.

The present drive train system also includes an annular-ring interface within components of the system for limiting the torque transmitted by a driven member in the system to a driven shaft in the system. This annular-ring interface and the advantages of the interface in the present system are discussed below under the heading of "Drive Torque Limiter."

No prior art drive train system is known which combines the advantages of the sliding crank arm and annular-ring interface of the present invention.

SUMMARY OF THE INVENTION

The present invention is a drive train system for rotating an axle connectable to the sytem, the axle being provided as part of a system external to the present drive train system. The axle is rotatable in the external system about an axis which is located at a fixed distance from and which is perpendicular to a drive screw in the actuator.

The present drive train system comprises a driven shaft comprising a drive screw rotatable about a fixed axis. A drive nut is located on the drive screw. The drive nut moves along the length of the drive screw as the drive screw is rotated.

The system further comprises a crank arm having a first member and a second member slideably innerconnected so that the first and second members slide longitudinally with respect to each other. The first member is connected to the drive nut so that the crank arm can pivot about the drive nut. The second member comprises apparatus for connecting the second member to the axle so that, as the drive nut moves along the drive screw, the axle connected to the second member is rotated. The first member of the crank arm slides along the second member of the crank arm as the drive nut moves and the axle turns.

The drive train system also comprises a wheel-shaped driven member having a center hole, the hole being sized for a substantial slip fit over the driven shaft, the driven shaft passing through the center hole.

A friction plate is located on one side of the driven member, the friction plate rotating without slippage with the shaft.

The system also comprises apparatus for preventing the driven member and the friction plate from sliding longitudinally on the shaft as well as apparatus for biasing the driven member and the friction plate together.

An annular-ring surface is located on either the friction plate or the driven member or both. The annular-ring surface is substantially concentric with the driven shaft and forms an annular-ring interface between the friction plate and the driven member. The transmitted torque between the driven member and the shaft is limited by frictional force between the friction plate and the driven member at the annular-ring interface.

DESCRIPTION OF THE PREFERRED EMBODIMENTS

System Overview

Figure 1:
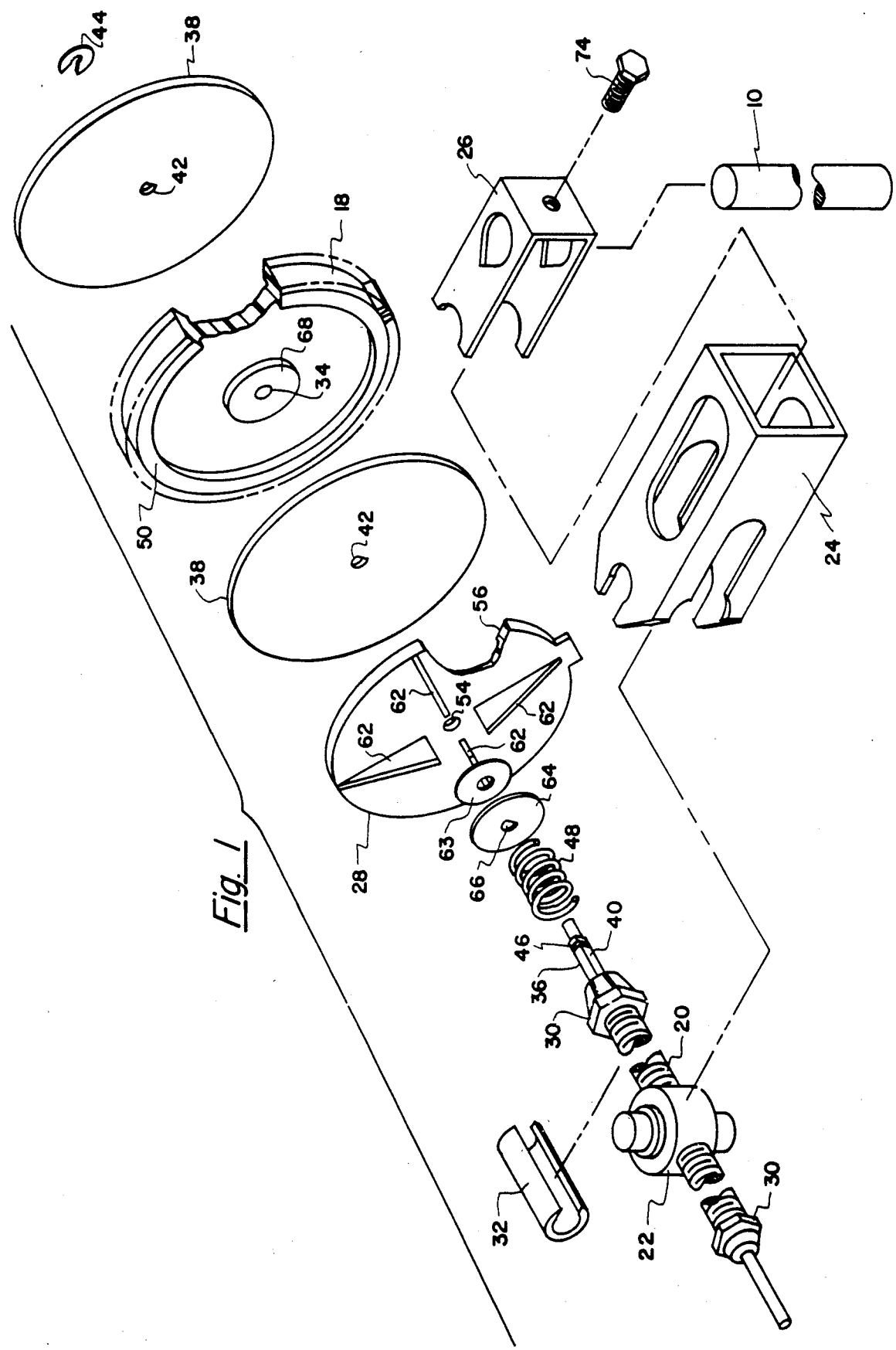
FIG. 1 is an exploded view diagram of a drive train system.

The present system is a drive train for rotating an axle 10 which is part of an external system. Axle 10 is typically part of a fluid control valve mechanism such as a butterfly-type valve. Such valves are present in air ducts in the form of dampers which may be opened or closed to varying degrees using the present system. In addition, the present system may be used to open and close water or steam valves in heating and cooling control systems. However, the present system is not limited to such applications.

The present system comprises a motor 12 having an output shaft 14 connected to a pinion gear 16 which in turn drives a driven member or gear 18. Driven member 18 is coupled to a drive screw 20 through a drive torque limiter to be described below. A drive nut 22 is located on drive screw 20 and is threaded to match the threads of drive screw 20. Accordingly, drive nut 22 moves along the length of drive screw 20 as drive screw 20 is rotated. A crank arm comprising member 24 is connected between drive nut 22 and axle 10 for the purpose of rotating axle 10 when drive screw 20 is rotated.

Through such a system, a substantial amount of torque can be placed on axle 10 using relatively inexpensive system components including an inexpensive motor 12. An example of a motor compatable with the present system is a synchronous bidirectional alternating current motor. Such a motor is available from Hansen Mfg. Co. Inc., Princeton, IL 47670-0023 as part number 237500-206C and is described in U.S. Pat. No. 4,355,248.

Although driven member 18 is shown as a gear driven by a pinion or driving gear 16, driven member 18 need not be a gear, but can be any driven member which can in turn be driven by anything that can rotate driven member 18. For example, driving member 16 and driven member 18 could be coupled through a belt system.

The system comprises stops 30, each of which may comprise a lock nut 30. Stops 30 are located at a predetermined position so that, when drive nut 22 arrives at a stop 30, the crank arm comprising member 24 will have arrived at a predetermined position. Stop nuts 30 are set so that the crank arm (and, therefore, axle 10) travels something less than 180 degrees between the two stops 30, and a travel of 90 degrees between stops 30 is typical. For selecting travel of the crank arm over a smaller swing, e.g., over a swing of 45 degrees, one or more spacers 32 may be snapped onto drive screw 20; by selecting the appropriate length of spacer 32, the full rotation of crank arm 24 (and, therefore, of axle 10) can be selected as 45 degrees or as some other predetermined swing.

Figure 2:
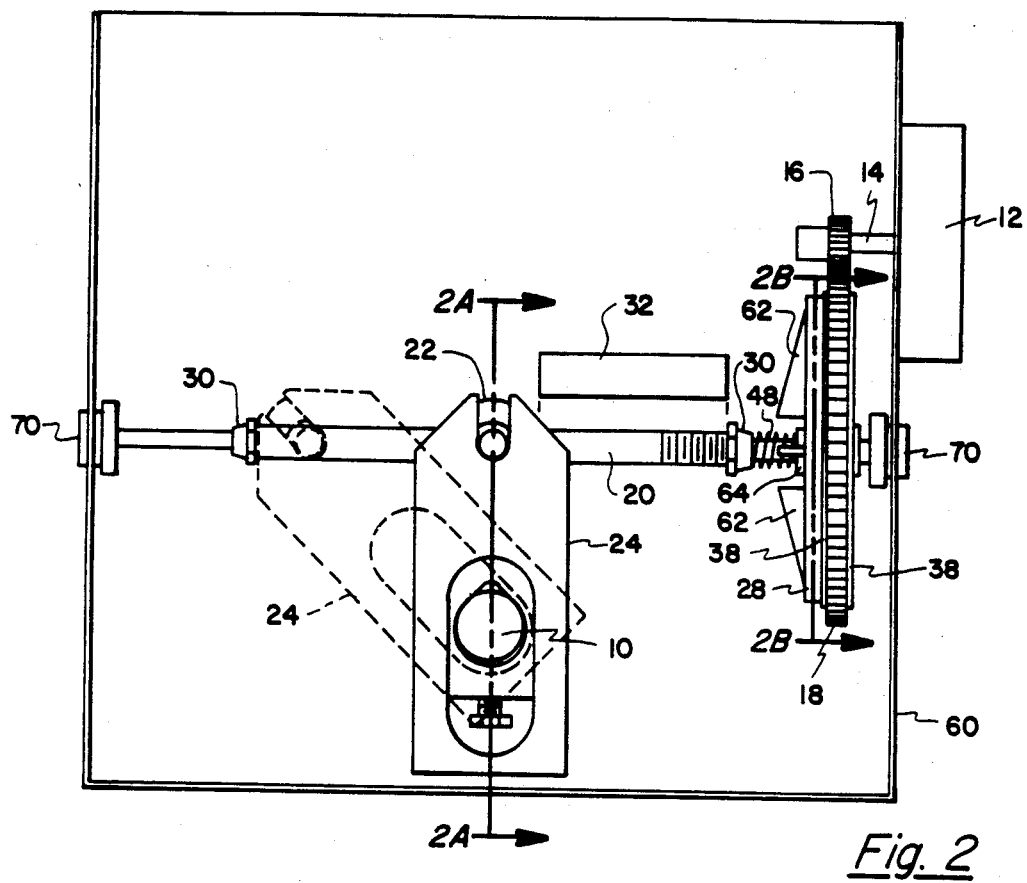
FIG. 2 is a plan view diagram of the drive train.
Figure 2A:
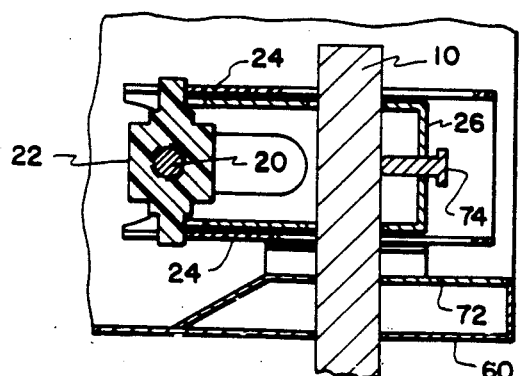
FIG. 2A is a section diagram of a crank arm compatable with the drive train system.

FIG. 2 illustrates the crank arm comprising member 24 in a first position (solid outline of member 24) and in a second position (dashed outline of member 24). Between the first position and the second position, member 24 (and, therefore, axle 10) has rotated 45 degrees. If the spacer 32 illustrated in FIG. 2 were snapped into position on drive shaft 20, the movement of the crank arm comprising member 24 would be limited to a 45 degree travel between one stop nut 30 and one end of spacer 32. On the other hand, if spacer 32 is removed, the crank arm comprising member 24 can travel 90 degrees between the two stop nuts 30.

Three key subsystems or components of the present system include a drive torque limiter for limiting torque transmitted from driven member 18 to drive shaft 20, an optional gear backlash quieter 28 for use in quieting the noise between gears 18 and 16, and a sliding crank arm comprising member 24. These three subsystems will now be described.

Drive Torque Limiter

The purpose of the drive torque limiter in the present system is to limit the torque transmitted by driven member 18 to drive shaft 20. It protects the motor and drive train from excessive stresses and from the noise and wear of stalling under heavy loading.

The present drive torque limiter comprises a wheel-shaped driven member 18 having a center hole 34 sized for a substantial slip fit over shaft 20. In the preferred embodiment, shaft 20 comprises a substantially smooth portion 36 (FIG. 1) turned to a diameter for a slip fit with hole 34. A friction plate 38 is located on one side of driven member 18 (as will be further discussed below, a friction plate 38 is used on each side of driven member 18 in the preferred embodiment). Friction plate 38 rotates without slippage with shaft 20; in the preferred embodiment, this is accomplished by a flat 40 on one side of shaft portion 36 and by a corresponding "D" hole 42 sized for a substantial slip fit over the D-shaped shaft portion 36.

The present system also comprises means for preventing driven member 18 and friction plate 38 from sliding longitudinally on the shaft. In the preferred embodiment, this is accomplished through use of a snap ring 44 which snaps into a groove 46 in shaft 20.

The system further comprises means for biasing driven member 18 and friction plate 38 together. This is accomplished in the preferred embodiment through a spring 48 located between a stop nut 30 and the driven member/friction plate assembly. By appropriately locating the position of stop nut 30, the bias of spring 48 can be adjusted as desired.

In addition, the drive torque limiter of the present system further comprises an annular-ring surface 50 on at least one of the friction plate 38 and the driven member 18. Accordingly, while annular-ring surface 50 may be located on either driven member 18 or on friction plate 38 or both, the preferred embodiment illustrated comprises annular-ring surface 50 on driven member 18. Annular-ring surface 50 is substantially concentric with driven shaft 20 and forms an annular-ring interface between friction plate 38 and driven member 18. The transmitted torque between driven member 18 and shaft 20 is limited by friction between friction plate 38 and driven member 18 at annular-ring interface 50. The friction determining the limit of the transmitted torque is related to the bias of spring 48, the outer and inner radii of annular-ring interface 50, and the friction coefficient at the annular-ring interface.

Use of an annular-ring interface 50 between friction plate 38 and driven member 18 provides a much more predictable and reproducible limit on the torque at which slippage will begin to occur between friction plate 38 and member 18. Slippage at a predetermined torque is important to consistent system performance; as previously indicated, the slippage protects the motor and drive train from excessive stresses and from the noise and wear of stalling under heavy loading.

In contrast to the present drive torque limiter, if the interface between friction plate 38 and driven member 18 are substantially flat surfaces over substantially the entire diameter of these elements, the torque at which slippage will begin to occur between friction plate 38 and driven member 18 will vary over the life of the product, particularly over the early life of the product. The varying torque caused by such a system can arise due to imperfections in the flatness at the interface. Such imperfections can cause a wandering average radius at which the transmitted torque limit is reached. On the other hand, through the use of the annular-ring interface of the present system, the torque can be highly controlled, since the radii determining the size of the annular-ring interface can be relatively close to each other in size. In addition, having a predictable interface surface area gives predictable unit loading (force per unit area), surface velocity, and wear.

Driven member 18 is shown with a hub 68 surrounding shaft hole 34. Hub 68 is not necessary and, in the preferred embodiment, does not comprise a portion of the frictional interface between friction plate 38 and driven member 18.

In addition to using an annular-ring interface between friction plate 38 and driven member 18, the present system provides advantages through selection of the materials and surface finishes of these elements. While the materials and finishes discussed below are not essential to the present drive torque limiter invention, they do provide excellent performance; other materials and finishes may also be used.

In the preferred embodiment, driven member 18 at the annular-ring interface 50 is fabricated of acetal, and friction plate 38 is fabricated of a material which is hard compared to acetal. In the preferred embodiment, driven member 18 is fabricated completely of acetal, and friction plate 38 is fabricated entirely of stainless steel.

In addition, friction plate 38 at the annular-ring interface comprises a surface finish for controlled wear of the acetal. A surface finish substantially within the range of 20-70 microinch finish at the annular-ring interface has been found to produce highly desirable results, and a surface finish within the range of 30-45 microinch is preferred.

As an alternate to fabricating driven member 18 at the annular-ring interface of acetal and to fabricating friction plate 38 at the annular-ring interface of a material which is hard compared to acetal, e.g., of stainless steel, it is consistent with the drive torque limiter invention of the present system to fabricate friction plate 38 at the annular-ring interface of acetal and to fabricate driven member 18 at the annular-ring interface of a material which is hard compared to acetal, e.g., of stainless steel.

In either case, it has been found that acetal has unique properties for a drive torque limiter as described. While other materials in the general plastics family may be available for a substitute to acetal, the inventor knows of none; many materials were explored before the unique advantages of the acetal/harder material, e.g., stainless steel, combination was settled upon and before the surface finishes of the present system were settled upon. These advantages include available materials and processes, low cost, stability through operating temperature range, durability in handling and use, compactness of assembly, long life, controlled wear insuring consistent performance, emission of non-conductive by-products of wear (significant where electronic circuitry coexists with the present system), and quiet operation.

As has previously been indicated, the preferred embodiment of the present system comprises a friction plate 38 located on each side of driven member 18. Accordingly, the preferred embodiment of the present system comprises means for forming an annular-ring interface between friction plates 38 on each side of driven member 18. This is accomplished in the preferred embodiment by forming driven member 18 with an annular-ring 50 on each side of the member. However, an annular-ring interface could also be formed by providing an annular-ring surface on friction plates 38 or on both friction plates 38 and driven member 18.

The diameter of the outer and inner radii determining the size of annular-ring surface 50 is determined in part by the torque at which it is desired to begin frictional slippage between driven member 18 and friction plates 38.

Gear Backlash Quieter

If the drive mechanism of the present system is configured to comprise a pinion gear 16 and a driven gear 18, it may be desirable to quiet noise generated by driven gear 18 and driving gear 16, this gear noise typically being most predominant at low load conditions. The solution to this problem is to maintain positive tooth engagement between the two gears by applying a controlled drag torque on driven gear 18.

In the present system as disclosed, the drag torque is a function of an annular-ring friction interface similar to that used in the drive torque limiter. As with that mechanism, the drag torque provided by the drag plate of the present system is a function of the annular-ring drag surface radii, the friction coefficient of the interface, and the bias or spring force used in biasing the drag plate toward the driven gear.

Use of a drag plate such as the one disclosed in the present system allows highly reproducible torque to be achieved by the system while also allowing use of low cost, low precision gears which are noisy without a backlash quieter, but which can be quieted in a highly controlled manner in a long life system through the present drag plate.

Accordingly, the present system comprises a drag plate 28 comprising a substantially rigid plate. A hole 54 is located in the plate and is sized for a substantial slip fit over portion 36 of shaft 20. An annular-ring drag surface 56 is formed on the plate for applying a force toward a driven gear such as 18. Annular-ring surface 56 is located concentric to hole 54 so that it will exert a concentric force toward the driven gear when the plate is slipped on shaft 20 and biased toward the gear.

Figure 2B:
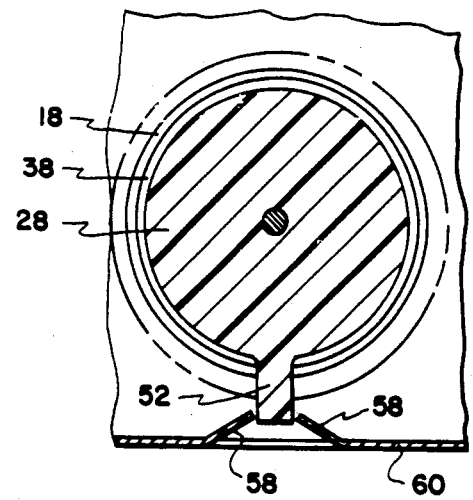
FIG. 2B is a section diagram of a gear backlash quieter compatable with the present system.

Since the purpose of drag plate 28 is to provide drag, there needs to be relative motion between the plate (i.e., the drag surface of the plate) and the driven member. In the present system, this is accomplished through means for preventing substantial rotation of the drag plate in either direction. As is illustrated in FIG. 2B, this is accomplished in the preferred embodiment through a tab 52 protruding from drag plate 28. Tab 52 is positioned between two stops 58 formed as part of system housing 60.

One advantage of the present drag plate is that it will quiet gear noise between gears 16 and 18 with the system running in either direction (this advantage is not present in some prior art systems; see, for example, U.S. Pat. No. 1,796,992). As previously indicated, another advantage of the present drag plate is that it will provide highly controlled drag torque which can be varied by varying the radius of the annular-ring surface (this advantage is believed to be unique in the prior art). Furthermore, the present drag plate provides a concentric loading onto the driven gear; therefore, the present drag plate enhances system longevity by avoiding imbalanced drag forces as are present in some prior art systems (see, for example, U.S. Pat. No. 2,016,745). No prior art gear quieting systems are known which comprise all of these advantages.

In the preferred embodiment of the present system, drag plate 28 at the annular-ring drag surface 56 is fabricated of acetal. Although this is a preferred material found to have superior wear and frictional interface properties, drag plate 28 may also be fabricated of other materials.

The drag plate of the present system is shown including reinforcing members 62 which help provide a substantially rigid plate; other means of providing a substantially rigid plate could also be used.

The present drag plate may be applied directly to a driven member 18. However, in the preferred embodiment of the present system, annular-ring drag surface 56 is biased against a friction plate 38 located between drag plate 28 and driven member 18. In addition, the present implementation of drag plate 28 is accomplished through an interface plate 64 placed between biasing spring 48 and drag plate 28. Interface plate 64 comprises a "D" hole for a slip over drive shaft portion 36. The interface plate, which rotates with shaft 20, protects the acetal drag plate 28 from wear due to the rotation of spring 48. In order to further enhance the longevity of the present system, an optional Teflon washer 63 may be included between interface plate 64 and drag plate 28.

As has been indicated by the preceding discussion, drag plate 28 may be fabricated at its annular-ring drag surface of acetal, and this approach is most desirable when the surface against which drag surface 56 is dragging is fabricated of a material which is hard compared to acetal. Alternately, drag surface 56 may be fabricated of a material which is hard relative to acetal, particularly if drag surface 56 is dragging against an acetal surface. For example, drag plate 28 could be fabricated of stainless steel or other metal.

Sliding Crank Arm

In the present actuator system, it was important to develop a crank arm which would operate within a confined space. This was necessitated by a confined space available to position the present system in some applications. Because of this and because of related space needs within housing 60, the system would not permit a crank arm which would protrude substantially beyond drive screw 20 as drive nut 22 moved the crank arm toward a perpendicular position to the drive screw. Likewise, there was insufficient room in the present system for the crank arm at axle 10 to project beyond a predetermined position as drive nut 22 progressed along drive screw 20. Examples of crank arms which were not suitable to the present invention are disclosed in U.S. Pat. Nos. 2,704,947; 3,575,378; and 3,877,677.

The sliding crank arm of the present system is connected between drive nut 22 and axle 10. The crank arm has a first member 24 and a second member 26 slideably interconnected so that the first and second members slide longitudinally with respect to one another. Member 24 is connected to drive nut 22 so that member 24 can pivot about drive nut 22. Member 26 is connected to axle 10, this connection is accomplished in the preferred embodiment through a set screw 74 locking against axle 10 which is held perpendicular to set screw 74 by apertures in member 26. As drive nut 22 moves along drive screw 20, axle 10 is rotated, member 26 of the crank arm sliding along member 24 of the crank arm as drive nut 22 moves and axle 10 turns.

As is apparent from the figures, the sliding crank arm of the present system may comprise an outer sleeve 24 and an inner sleeve 26 sliding within outer sleeve 24. However, any crank arm embodiment where a first member and a second member are slideably interconnected so that the first and second members slide longitudinally with respect to each other would be consistent with the sliding crank arm invention of the present system.

The embodiments of an invention in which an exclusive property or right is claimed are defined as follows:

1. A drive train system for rotating an axle connectable to the system, the axle being provided as part of a system external to the drive train system, the axle being rotatable in the external system about an axis which is located at a fixed distance from and which is perpendicular to a drive screw in the drive train system, the drive train system comprising:
   a driven shaft comprising a drive screw rotatable about a fixed axis;
   a drive nut on the drive screw, the drive nut moving along the length of the drive screw as the drive screw is rotated;
   a crank arm having a first member and a second member slideably innerconnected so that the first and second members slide longitudinally with respect to each other, the first member being connected to the drive nut so that the crank arm can pivot about the drive nut, the second member comprising means for connecting the second member to the axle so that, as the drive nut moves along the drive screw, the axle connected to the second member is rotated, the first member of the crank arm sliding along the second member of the crank arm as the drive nut moves and the axle turns;
   a wheel-shaped driven member having a center hole, the hole being sized for a substantial slip fit over the driven shaft, the driven shaft passing through the center hole;
   a friction plate on one side of the driven member, the friction plate rotating without slippage with the shaft;
   means for preventing the driven member and the friction plate from sliding longitudinally on the shaft;
   means for biasing the driven member and the friction plate together; and
   an annular-ring surface on at least one of the friction plate and the driven member, the annular-ring surface being substantially concentric with the driven shaft and forming an annular-ring interface between the friction plat and the driven member, the transmitted torque between the driven member and the shaft being limited by frictional force between the friction plate and the driven member at the annular-ring interface.

2. The apparatus of claim 1 wherein:
   the driven member at the annular-ring interface is fabricated of acetal; and
   the friction plate at the annular-ring interface is fabricated of a material which is hard compared to acetal.

3. The apparatus of claim 2 wherein the friction plate at the annular-ring interface is fabricated of stainless steel.

4. The apparatus of claim 2 wherein the surface of the friction plate at the annular-ring interface comprises a surface finish for controlled wear of the acetal.

5. The apparatus of claim 2 wherein the surface finish of the friction plate at the annular-ring interface is substantially within the range of 20-70 microinch finish.

6. The apparatus of claim 1 wherein:
   the friction plate at the annular-ring interface is fabricated of acetal; and
   the driven member at the annular-ring interface is fabricated of a material which is hard compared to acetal.

7. The apparatus of claim 6 wherein the surface of the driven member at the annular-ring interface comprises a surface finish for controlled wear of the acetal.

8. The apparatus of claim 6 wherein the surface finish of the driven member at the annular-ring interface is substantially within the range of 20-70 microinch finish.

9. A drive train system for rotating an axle connectable to the system, the axle being provided as part of a system external to the drive train system, the axle being rotatable in the external system about an axis which is located at a fixed distance from and which is perpendicular to a drive screw in the drive train system, the drive train system comprising:
   a driven shaft comprising a drive screw rotatable about a fixed axis;
   a drive nut on the drive screw, the drive nut moving along the length of the drive screw as the drive screw is rotated;
   a crank arm having a first member and a second member slideably innerconnected so that the first and second members slide longitudinally with respect to each other, the first member being connected to the drive nut so that the crank arm can pivot about the drive nut, the second member comprising means for connecting the second member to the axle so that, as the drive nut moves along the drive screw, the axle connected to the second member is rotated, the first member of the crank arm sliding along the second member of the crank arm as the drive nut moves and the axle turns;
   a driven gear having a center hole, the hole being sized for a substantial slip fit over the driven shaft, the driven shaft passing through the center hole;

a friction plate on each side of the driven gear, the friction plates rotating without slippage with the shaft;

means for preventing the driven gear and the friction plates from sliding longitudinally on the driven shaft;

means for biasing the driven gear and the friction plates together;

means for forming an annular-ring interface between the friction plates and each side of the driven gear, the annular-ring interface being substantially concentric with the driven shaft, the transmitted torque between the driven gear and the driven shaft being limited by friction between the friction plates and the driven gear at the annular-ring interfaces; and a drag plate comprising a substantially rigid plate, the drag plate further comprising a hole in the plate for the driven shaft, the hole being sized for a substantial slip fit over the driven shaft, the plate being located on the shaft on one side of the driven gear between one of the friction plates and the means for biasing, the drag plate further comprising means for providing relative motion between the drag plate and the friction plate adjacent the drag plate, the drag plate further comprising an annular-ring drag surface on the plate, the annular-ring drag surface facing the friction plate adjacent the drag plate and being located concentric to the hole and so that it will exert a concentric force toward the driven gear at the location of the annular-ring drag surface.

10. The apparatus of claim 9 wherein:

the driven gear at the annular-ring interface is fabricated of acetal; and the friction plates at the annular-ring interfaces are fabricated of a material which is hard compared to acetal.

11. The apparatus of claim 10 wherein the friction plates at the annular-ring interfaces are fabricated of stainless steel.

12. The apparatus of claim 10 wherein the surface of the friction plates at the annular-ring interfaces comprises a surface finish for controlled wear of the acetal.

13. The apparatus of claim 10 wherein the surface finish of the friction plates at the annular-ring interfaces is substantially within the range of 20–70 microinch finish.

14. The apparatus of claim 9 wherein:

the friction plates at the annular-ring interface are fabricated of acetal; and the driven gear at the annular-ring interfaces is fabricated of a material which is hard compared to acetal.

15. The apparatus of claim 14 wherein the surfaces of the driven gear at the annular-ring interfaces comprise a surface finish for controlled wear of the acetal.

16. The apparatus of claim 14 wherein the surface finish of the driven gear at the annular-ring interfaces is substantially within the range of 20–70 microinch finish.

17. The apparatus of claim 9 wherein the drag plate at the annular-ring drag surface is fabricated of acetal.

18. The apparatus of claim 17 wherein the surface finish of the friction plate at the interface with the annular-ring drag surface of the drag plate is fabricated of stainless steel having a surface finish substantially within the range of 20–70 microinch finish.

19. The apparatus of claim 9 wherein the means for providing relative motion comprises means for preventing substantial rotation of the drag plate in either direction.

20. The apparatus of claim 19 wherein the means for preventing substantial rotation comprises a tab protruding from the plate.

* * * * *